(12) United States Patent
Wooward, Jr.

(10) Patent No.: US 7,548,543 B2
(45) Date of Patent: Jun. 16, 2009

(54) GENERATION OF VALID PROGRAM CLOCK REFERENCE TIME STAMPS FOR DUPLICATE TRANSPORT STREAM PACKETS

(75) Inventor: William D. Wooward, Jr., Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 460 days.

(21) Appl. No.: 11/419,414

(22) Filed: May 19, 2006

(65) Prior Publication Data

US 2007/0268902 A1    Nov. 22, 2007

(51) Int. Cl.
 *H04L 12/28* (2006.01)
 *H04J 3/06* (2006.01)
(52) U.S. Cl. .................... 370/392; 370/503
(58) Field of Classification Search ............ 370/252, 370/392, 400, 401, 474–476, 503
 See application file for complete search history.

(56) References Cited

U.S. PATENT DOCUMENTS

| | | | |
|---|---|---|---|
| 6,377,588 B1 * | 4/2002 | Osaki | 370/508 |
| 6,429,902 B1 * | 8/2002 | Har-Chen et al. | 348/518 |
| 6,724,825 B1 * | 4/2004 | Nemiroff et al. | 375/240.27 |
| 6,940,873 B2 * | 9/2005 | Boyle et al. | 370/503 |
| 2002/0118679 A1 * | 8/2002 | Eyer | 370/389 |
| 2003/0058890 A1 * | 3/2003 | Ritchie et al. | 370/486 |
| 2005/0039064 A1 | 2/2005 | Balakrishnan et al. | |
| 2005/0041661 A1 | 2/2005 | Thorsteinson et al. | |
| 2005/0094809 A1 * | 5/2005 | Pedlow et al. | 380/200 |
| 2005/0152548 A1 * | 7/2005 | Wasilewski | 380/216 |
| 2005/0180732 A1 | 8/2005 | Ono | |

FOREIGN PATENT DOCUMENTS

EP    1 478 184 A1    11/2004

OTHER PUBLICATIONS

"Information Technology-Generic coding of moving pictures and associated audio information: Systems." Int'l Standard ISO/IEC, vol. 13818-1, 1st Edition, Apr. 15, 1006.
International Search Report of corresponding international application PCT/US2007/068639 mailed Nov. 22, 2007.

* cited by examiner

*Primary Examiner*—Hong Cho
(74) *Attorney, Agent, or Firm*—Merchant & Gould

(57) ABSTRACT

The present invention is suitable for use in a communications system that transmits a transport stream, such as an MPEG stream. The present invention addresses the need of generating a valid value for a duplicated packet in the transport stream. A first embodiment of the present invention interpolates between a PCR value in the duplicated packet and the PCR value in the next PCR packet. A second embodiment of the present invention copies an original packet along with its PCR value into a duplicate packet and a PCR-bearing packet. Subsequently, the present invention interpolates a new value for the original packet based on the original value in the duplicated PCR-bearing packet and the previous value in a PCR-bearing packet.

11 Claims, 5 Drawing Sheets

GENERATION OF VALID PROGRAM CLOCK REFERENCE TIME STAMPS FOR DUPLICATE TRANSPORT STREAM PACKETS

FIELD OF THE INVENTION

The present invention relates generally to the field of a transport stream in a communications system, and more specifically towards generating program clock reference time stamps for duplicate transport stream packets.

BACKGROUND OF THE INVENTION

Communications systems transmit video, voice, and data signals comprised in a transport stream, such as an MPEG (Motions Picture Entertainment Group) stream. The video, voice, and data signals are packaged in packets each having a packet identification number (PID) and then transmitted throughout the system according to header information. At times, the transport stream may include duplicate packets. The MPEG specification states that in transport streams, duplicate packets may be sent as two, and only two, consecutive transport stream packets of the same PID. In the duplicate packets, each byte of the original packet shall be duplicated, with the exception that in a program clock reference (PCR) field, if present, a valid value shall be encoded.

If the duplicate packet is generated at the time the transport packet stream is generated, creating the valid PCR value for the duplicate packet is a simple process. More specifically, when a duplicate packet is duplicated a clock reference is taken immediately from a system clock. If, however, the duplicate packet is added to the stream at some point during the transmission process, there is no specified scheme for generating a valid PCR value since the system clock is not available. What is needed, therefore, is a method and system to generate a valid PCR value when a packet in the transport stream is duplicated during the transmission process.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is suitable for use in a communications system. More specifically, the present invention is implemented when the communications system adds a duplicate packet to a transport stream. Typically, when a packet is duplicated, each byte of the original packet is also duplicated with the exception of a program clock reference (PCR) field, which must have a valid value encoded in the field. The present invention teaches systems and methods of encoding the new PCR value for the duplicated packet. It will be appreciated that various versions of hardware and software used in conjunction with the hardware are available to implement the present invention.

Figure 1:
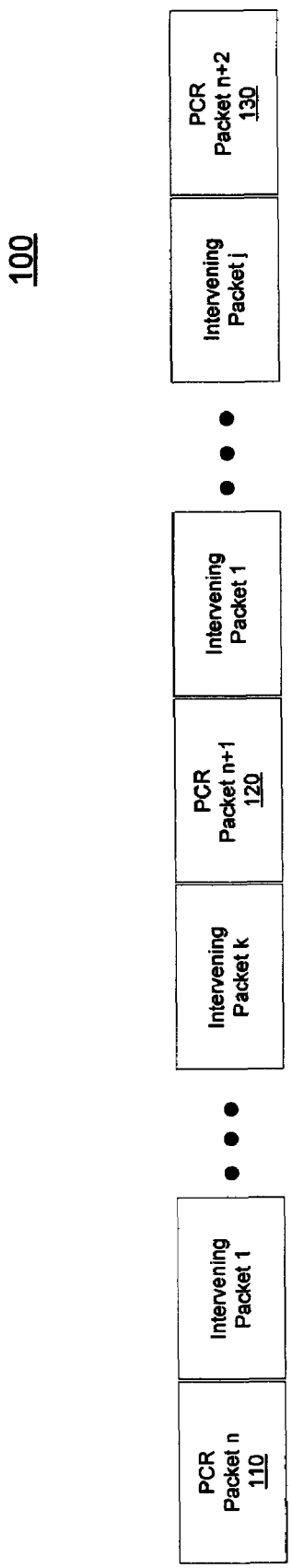
FIG. 1 illustrates an abridged transport stream containing an occasional packet that carries a PCR time stamp.
Figure 2:
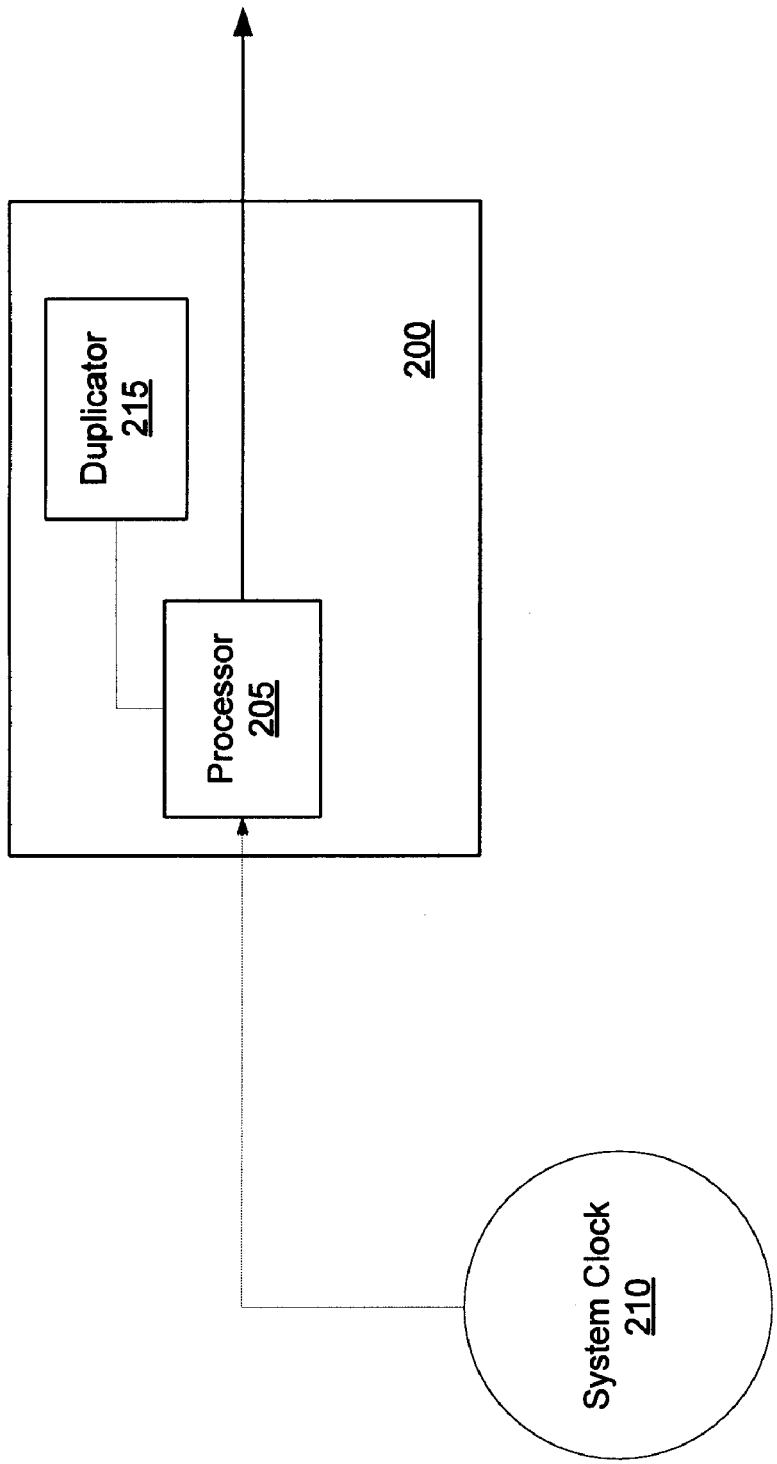
FIG. 2 is a block diagram of an MPEG processing device along with a system clock.

FIG. 1 illustrates an abridged transport stream containing an occasional packet that carries a PCR time stamp. PCR-bearing packets 110, 120, 130 are transmitted along with other intervening packets in the transport stream 100. The timing data contained in PCR-bearing packets 110, 120, 130, represents the time that the packets should arrive at their intended destination. FIG. 2 is a block diagram of an MPEG processing device 200 along with a system clock. The PCR value is generated by a processor 205 obtaining a time value from the system clock 210 at the time the packet is duplicated by duplicator 215. A device that receives the PCR-bearing packet then compares the PCR value with its local clock time and adjusts the frequency of its local clock to reduce the error between the local clock and the received PCR value.

Figure 3:
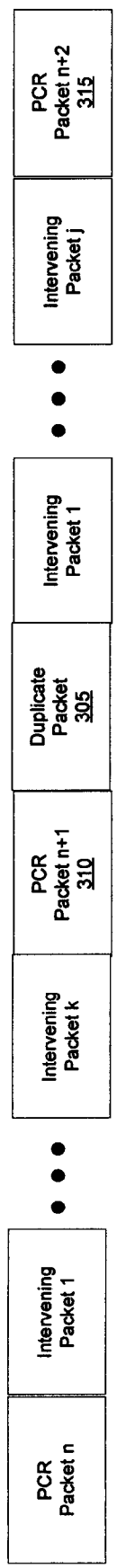
FIG. 3 illustrates an abridged transport stream that contains a duplicated packet having a valid PCR-bearing packet in accordance with a first embodiment of the present invention.
Figure 5:
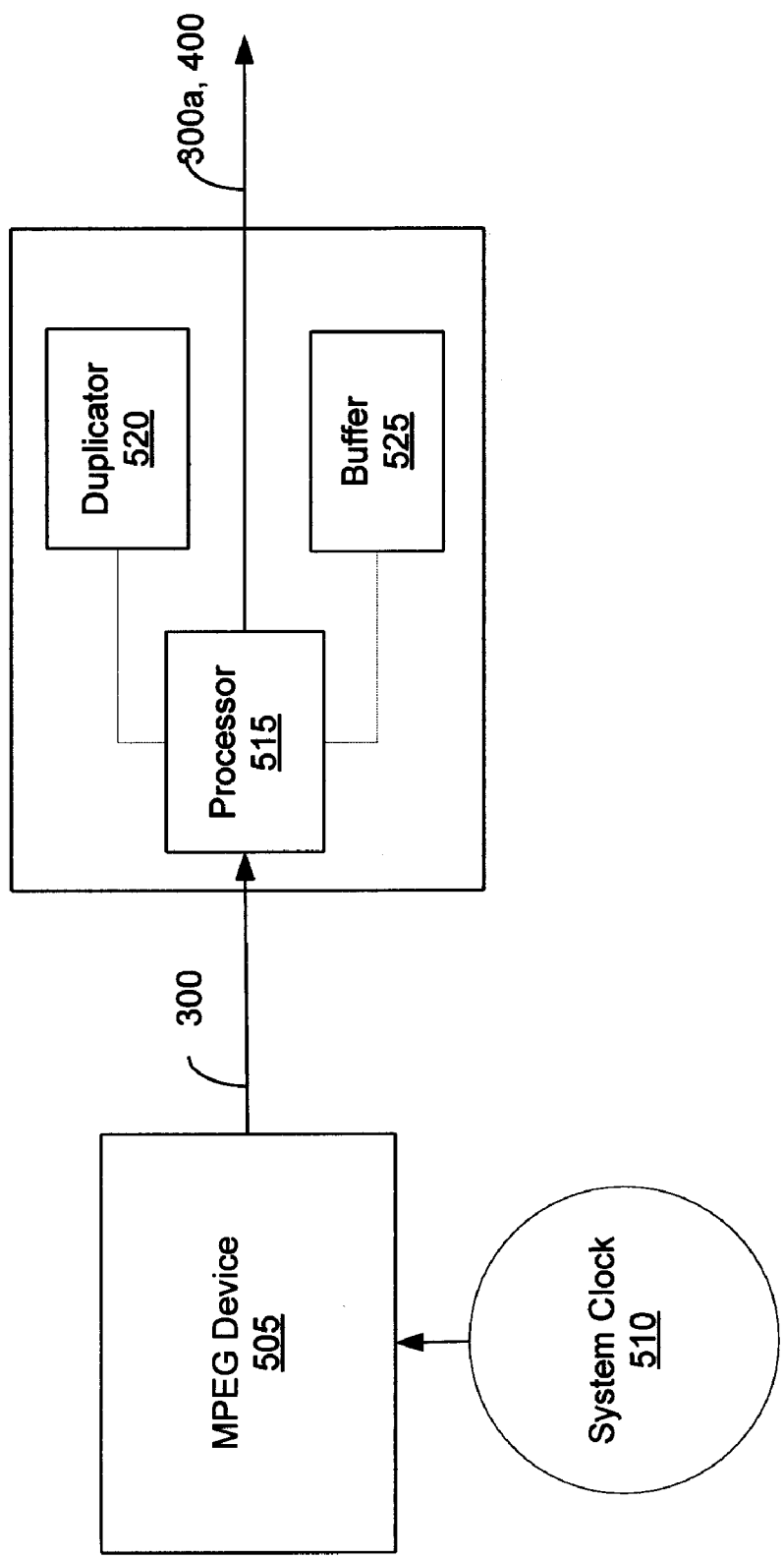
FIG. 5 is a block diagram of an MPEG processing device having a system clock and a duplicating device in accordance with the present invention.

FIG. 3 illustrates an abridged transport stream 300 that contains a duplicated packet 305 having a valid PCR-bearing packet in accordance with a first embodiment of the present invention. In conjunction with FIG. 5, an MPEG device 505 generates a transport stream 300 where packets in the transport stream 300 include PCR-bearing packets. The PCR values are generated by a system clock 510. A duplicate packet 305 is subsequently added to the original transport stream 300 by a processor 515 and a duplicator device 520. Since the system clock 510 is unavailable a valid PCR value must be generated for duplicate PCR-bearing packet 305. The valid PCR value for the duplicate packet is generated by interpolating between a PCR value contained in the packet 310 being duplicated and a PCR value contained in the next PCR packet 315. The valid PCR value for the duplicate packet 305 is generated using the following Equation 1:

$$PCR_{duplicate} = PCR_{n+1} + \frac{PCR_{n+2} - PCR_{n+1}}{j+2}$$

Although not stated in Equation 1, the PCR values have been converted to linear math (the PCRbase and PCRextension values have been combined), and the result is converted to the proper two-part representation. In Equation 1, 'j' is equivalent to the number of intervening packets between PCR-bearing packets in the original stream, i.e., prior to a duplicate packet added to the stream. In other words, in FIG. 3, 'j' represents the number of intervening packets excluding the duplicate packet 305 between PCR-bearing packet$_{n+1}$ 310 and PCR-bearing packet$_{n+2}$ 315.

While Equation 1 produces a valid PCR value, it has the drawback of requiring knowledge of the PCR value in PCR$_{n+2}$ packet 315 before the duplicate packet 305 can be generated. This requires storing up to 100 msec of transport data in buffer 525 to determine PCR$_{n+2}$. While this is generally not an issue for devices performing packet dejittering, it is a significant burden on devices that rely on PCR timestamp correction.

Figure 4:
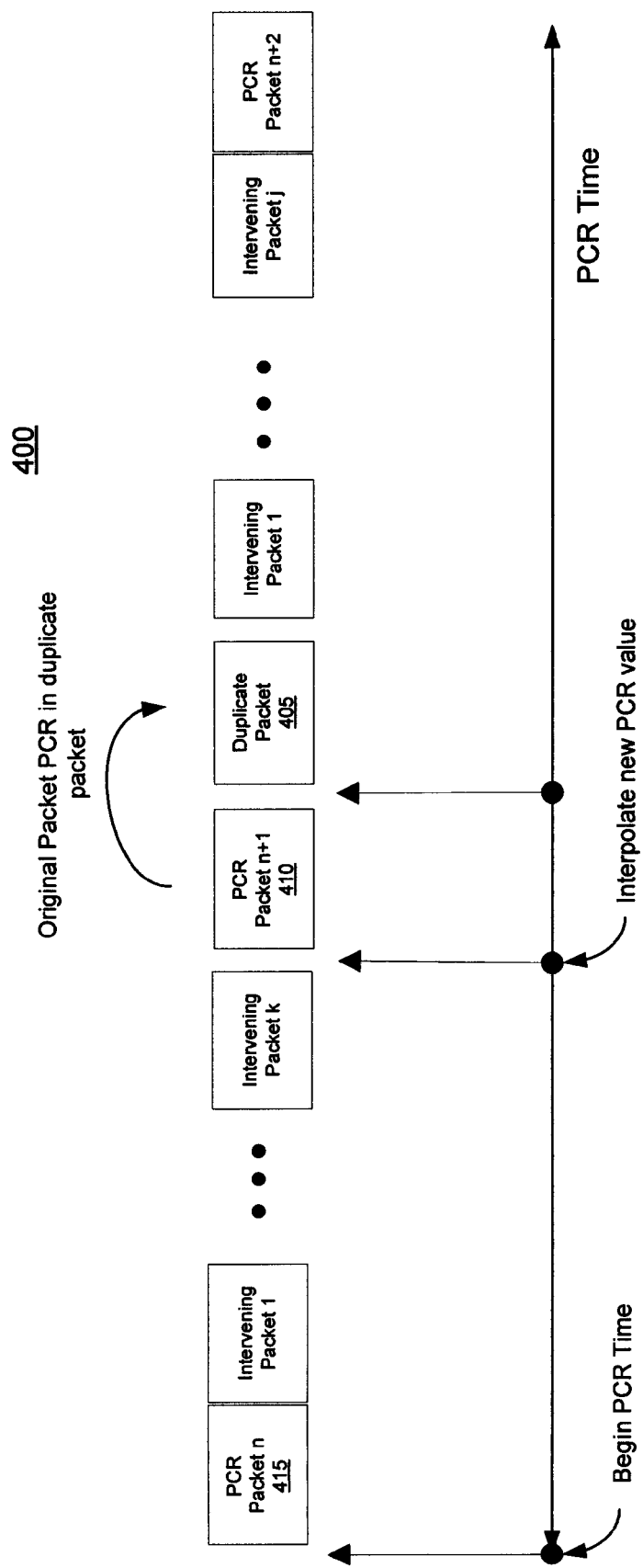
FIG. 4 illustrates an abridged transport stream having a duplicate packet and a valid PCR-bearing packet for the duplicate packet in accordance with a second embodiment of the present invention.

FIG. 4 illustrates an abridged transport stream having a duplicate packet and a valid PCR-bearing packet for the duplicate packet in accordance with a second embodiment of the present invention. In conjunction with FIG. 5, a duplicate packet 405 is generated later and subsequently added to the transport stream 300. In this manner, generating a valid PCR value for a PCR-bearing packet 405 is not accomplished in the same manner as illustrated with FIG. 2 since the transport stream 300 has been transmitted and the system clock 510 is not available for obtaining a value.

Therefore, in accordance with the present invention, the following Equation 2 is performed to generate a valid PCR value.

$$PCR_{n+1(new)} = PCR_{n+1(old)} - \frac{PCR_{n+1(old)} - PCR_n}{k+2}$$

In contrast with Equation 1, Equation 2 determines a new PCR value ($PCR_{n+1(new)}$) for an original packet 410 of the duplicate packet 405. As known, the original packet 410 has an associated PCR value. In accordance with the present invention, the original packet 410 and its PCR value is duplicated to provide duplicate packet 405. As mentioned, however, the MPEG specification states that in duplicate packets the PCR fields shall have a valid value. Accordingly, instead of interpolating a valid value for the PCR value of the duplicate packet 405, a new value is calculated for the original packet 410 and is determined using Equation 2 shown above. $PCR_{n+1(new)}$ for the original packet is determined by interpolating a new value between the two known values. 'k' in Equation 2 is equivalent to the number of intervening packets between PCR packet$_n$ 415 and the original packet 410. In this manner, only the previous PCR value, in this case PCR packet$_n$ 415, has to be stored instead of storing significant transport stream data as required for Equation 1. It will be appreciated that subsequent PCR values can continuously replace the stored PCR values in order to provide the latest PCR value when a duplicated packet is generated.

It should also be noted that PCR-bearing packets in the transport stream, such as an MPEG stream, may be modified by packet processing equipment to correct for any PCR jitter or delays that may be introduced into the stream. A typical implementation of time stamp correction involves adjusting the PCR value for the variable processing time in the processing device. The following calculation is performed for each PCR-bearing packet:

$$PCR_{new} = PCR_{original} + t_{out} - t_{in}$$

It will be appreciated that $t_{out}$ is the departure time of the PCR-bearing packet from an MPEG processing device and $t_{in}$, is the arrival time of the PCR-bearing packet at the MPEG processing device. When the PCR-bearing packet arrives at a receiving device, a local arrival time, which is based on a local clock, is captured and associated with that packet until it departs. If the duplicate packet is generated within the processing device, there is no arrival time so a value is generated based on the arrival time of the associated PCR-bearing packet. In this case, the following equation is used:

$$t_{in} = t_{in} + \frac{t_{in(PCR_{n+2})} - t_{in(PCR_{n+1})}}{j+2}$$

Furthermore in accordance with the present invention, the transport stream including a duplicated packet 305, 405 that was added after transmission of the transport stream as in FIGS. 3 and 4 may be modified by packet processing equipment to correct for any PCR jitter or delays. In accordance with the present invention, Equation 3 as follows further modifies the transport stream to adjust for any of these types of delays:

$$t_{in} = t_{in} + \frac{t_{in(PCR_{n+1})} - t_{in(PCR_n)}}{j+2}$$

It will be appreciated that modifications can be made to the embodiment of the present invention that is still within the scope of the invention. Additionally, the present invention can be implemented using hardware and/or software that are within the scope of one skilled in the art. The embodiments of the description have been presented for clarification purposes; however, the invention is defined by the following claims.

What is claimed is:

1. A method of transmitting a transport stream having duplicate packets, the method comprising the steps of:
    generating a transport stream having a plurality of program clock reference (PCR)-bearing packets, wherein a PCR value contained in a PCR-bearing packet is obtained from a system clock;
    transmitting the transport stream;
    duplicating an original packet of the transport stream, wherein the original packet comprises a first PCR value; and
    interpolating a valid PCR value for the duplicated packet;
    wherein the interpolating comprises:
        determining a second PCR value in a subsequent packet in the transport stream;
        determining a number of intervening packets excluding the duplicated packet between the original packet and the subsequent packet; and
        generating the valid PCR value for the duplicated packet by interpolating between the first and the second PCR value.

2. The method of claim 1, further comprising the step of storing a portion of the transport stream including the duplicated packet and the subsequent packet in order to determine the second PCR value.

3. A method of transmitting a transport stream having duplicate packets, the method comprising the steps of:
    generating a transport stream having a plurality of program clock reference (PCR)-bearing packets, wherein a PCR value contained in a PCR-bearing packet is obtained from a system clock;
    transmitting the transport stream;
    duplicating an original packet of the transport stream, wherein the original packet comprises a first PCR value; and
    interpolating a valid PCR value for the original packet;
    wherein the duplicated packet contains the first PCR value and the interpolating step comprises:

storing a second PCR value from a previously transmitted packet in the transport stream;

determining a number of intervening packets between the previously transmitted packet and the original packet; and generating the valid PCR value for the original packet by interpolating between the first and the second PCR value.

4. The method of claim 3, further comprising the steps of:

transmitting a new portion of the transport stream subsequent to transmitting the duplicated packet;

detecting a subsequent PCR value in the new portion; and replacing the stored second PCR value with the subsequent PCR value.

5. A duplicating device for transmitting a transport stream having duplicated packets, the duplicating device comprising:

a processor for receiving a transport stream comprising a plurality of program clock reference (PCR)-bearing packets, wherein a PCR value contained in a PCR-bearing packet is obtained from a system clock, and for generating a valid PCR value; and a duplicator device for duplicating an original packet having a first PCR value in the transport stream;

wherein the processor interpolates the valid PCR value for the duplicated packet by using a second PCR value in a subsequent packet, the first PCR value, and an intervening number of packets between the original packet and the subsequent packet prior to the duplicated packet being added to the transport stream.

6. A duplicating device for transmitting a transport stream having duplicated packets, the duplicating device comprising:

a processor for receiving a transport stream comprising a plurality of program clock reference (PCR)-bearing packets, wherein a PCR value contained in a PCR-bearing packet is obtained from a system clock, and for generating a valid PCR value; and a duplicator device for duplicating an original packet having a first PCR value in the transport stream;

wherein the processor interpolates the valid PCR value for the duplicated packet and stores the duplicated packet and an intervening number of packets in a buffer until a subsequent packet having an second PCR value is received.

7. The duplicating device of claim 6, wherein the processor uses the second PCR value in the subsequent packet, the first PCR value, and the intervening number of packets between the original packet and subsequent packet prior to the duplicated packet being added to the transport stream to determine the valid PCR value.

8. A duplicating device for transmitting a transport stream having duplicated packets, the duplicating device comprising:

a processor for receiving a transport stream comprising a plurality of program clock reference (PCR)-bearing packets, wherein a PCR value contained in a PCR-bearing packet is obtained from a system clock, and for generating a valid PCR value; and a duplicator device for duplicating an original packet having a first PCR value in the transport stream;

wherein the processor interpolates the valid PCR value for the original packet, the duplicated packet contains the first PCR value, and the processor uses a second PCR value in a previously transmitted packet, the first PCR value, and an intervening number of packets between the previously transmitted packet and the original packet to determine the valid PCR value.

9. A duplicating device for transmitting a transport stream having duplicated packets, the duplicating device comprising:

a processor for receiving a transport stream comprising a plurality of program clock reference (PCR)-bearing packets, wherein a PCR value contained in a PCR-bearing packet is obtained from a system clock, and for generating a valid PCR value; and a duplicator device for duplicating an original packet having a first PCR value in the transport stream;

wherein the duplicated packet contains the first PCR value, and the processor interpolates the valid PCR value for the original packet and stores a second PCR value in a previously transmitted packet until the original packet is duplicated.

10. The duplicating device of claim 9, wherein the processor uses the stored second PCR value, the first PCR value, and an intervening number of packets between the previously transmitted packet and the original packet to determine the valid PCR value.

11. The duplicating device of claim 10, wherein the processor stores a PCR value in a PCR-bearing packet received subsequent to the duplicated packet.

* * * * *